July 30, 1963 W. FRICKE 3,099,425

JET PROPULSION SYSTEM

Filed Nov. 29, 1961

Wilhelm Fricke
INVENTOR.

BY Mestern Ross + Mestern

AGENT.

United States Patent Office 3,099,425
Patented July 30, 1963

3,099,425
JET PROPULSION SYSTEM
Wilhelm Fricke, Buchholz-Nordheide, Germany, assignor to Hamburger Flugzeugbau G.m.b.H., Hamburg-Finkenwerder, Germany, a company of Germany
Filed Nov. 29, 1961, Ser. No. 155,776
Claims priority, application Germany Dec. 16, 1960
4 Claims. (Cl. 244—74)

The present invention relates to thrust nozzles for jet aircraft, in particular to nozzles provided with thrust-reversal ports.

Because of aerodynamic and internal-flow considerations it is desirable to have pairs of jet engines and their intake ducts situated on opposite sides of an aircraft fuselage. If the conventional in-line arrangement of intake, engine and thrust nozzle is maintained, the employment of thrust-reversal techniques is difficult because of the desirability of limiting the orientation of the thrust-reversal jets to a horizontal plane. This is so because an upward discharge from the nozzle would damage the empennage whereas downward thrust would, upon landing, stir up dust and cause the swirling gas cloud above the ground, along with any debris entrained thereby, to enter the intake of the engines.

In commonly assigned application Ser. No. 56,559, filed on September 16, 1960, by Eduard Tönnies and me, now Patent No. 3,060,685, issued October 30, 1962, the foregoing problem has been solved by the provision of a common exhaust conduit for the tubes of two or more jet engines, this conduit having a common outlet for the combined thrust gases and a pair of opposite lateral ports for the discharge of these gases upon thrust reversal; suitable shutters or baffles are provided for alternately directing the gases to the common outlet or to the lateral discharge ports. The baffle system is so designed that, in the case of failure of one engine, the gases from the other engine or engines are diverted so as to pass in a balanced manner through both lateral ports for purposes of thrust reversal.

It is an object of my present invention to provide an improved jet-propulsion system with twin engines and thrust-reversing means wherein the need for deflecting the thrust gases in the event of failure of one engine is avoided.

More particularly, it is an object of this invention to provide a system of the character referred to wherein each of two thrust nozzles individually associated with the twin engines is provided with a respective pair of symmetrically positioned exhaust ducts for the reverse thrust adapted to discharge in a substantially horizontal direction below the tail-wing assembly of the craft.

These objects are realized, in accordance with my invention, through a relative offsetting of the rear terminal sections of the twin discharge tubes in such manner that these sections are vertically superimposed upon each other, the pairs of discharge ports for the thrust reversal being alignedly disposed on opposite sides of the superimposed sections. Thus, at least one of these tubes and preferably each of them is twisted out of the common horizontal plane occupied by the forward tube portions over the greater part of their length.

The invention will be described in greater detail with reference to the accompanying drawing in which.

Figure 1:
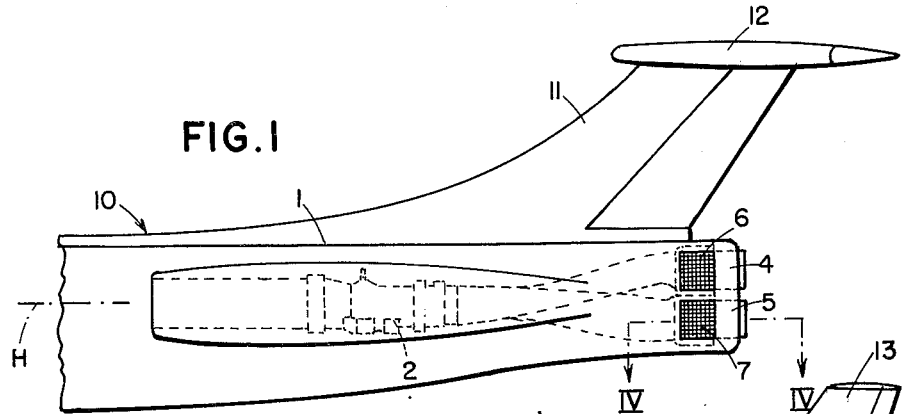
FIG. 1 is a side-elevational view of the tail of an aircraft embodying the invention.
Figure 2:
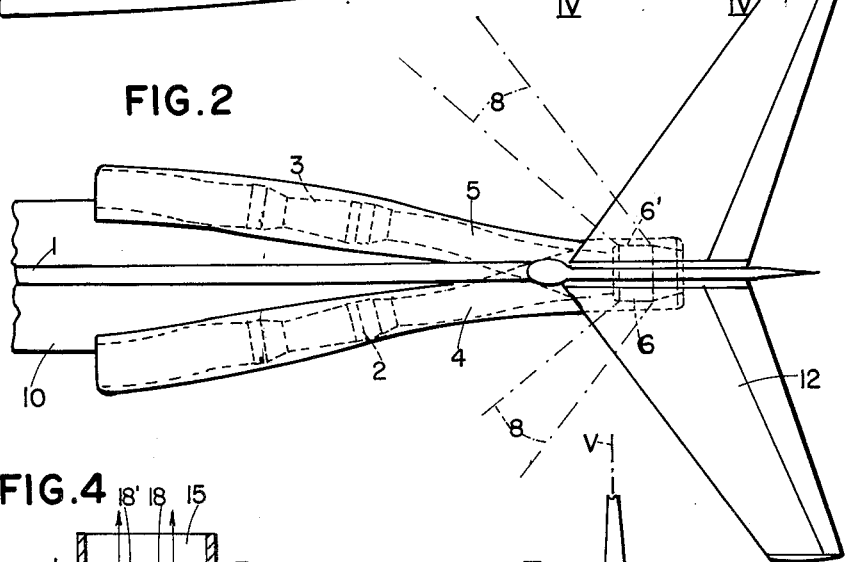
FIG. 2 is a top view of the same part of the craft.

At 1 there is shown the tail section of the fuselage of an aircraft 10 with its empennage 11 and exhaust ducts 4, 5 underneath the plane of the tail wings 12, 13 thereof. Jet engines 2, 3 within these ducts produce thrust gases normally discharged through the rear outlets 14, 15 thereof. In order to generate reverse thrust, each of these ducts is also provided with a pair of lateral discharge ports indicated at 6, 6' in the case of duct 4 and at 7, 7' in the case of duct 5.

Figure 4:
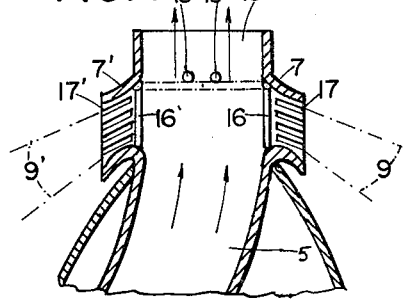
FIG. 4 is a sectional view taken on the line IV—IV of FIG. 1.
Figure 3:
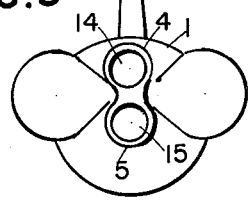
FIG. 3 is an end view.

The terminal sections of ducts 4, 5 have been twisted out of their common horizontal plane H in such manner that the outlets 14, 15 overlie each other in the vertical median plane V of the craft, the discharge ports 6, 7 and 6', 7' on opposite sides of the fuselage being also vertically aligned with each other. Each of the ducts 4 and 5, as particularly illustrated in FIG. 4 for the duct 5, is internally provided with a pair of baffles 16, 16' which, when rotated from their normal (solid-line) position into their thrust-reversing (dot-dash) position, deflect the thrust gases outwardly and inclinedly forwardly in jets 8, 8' (duct 4) and 9, 9' (duct 5). Louvers 17, 17' in the ports 6, 6' and 7, 7' help direct the discharge of the ducts along the desired paths. Stops 18, 18' hold the baffles 16, 16' in their alternate positions in which the outlet 14 or 15 is blocked thereby.

It is to be understood that the baffle system shown in the drawing may be altered, e.g. along the lines disclosed in the copending application identified above, and that other modifications are possible (including, for example, the use of more than two ducts with superimposed nozzles) within the spirit and scope of the invention as defined in the appended claims.

I claim:

1. In a jet-propelled aircraft having a fuselage and a pair of jet engines symmetrically disposed in a substantially horizontal plane, in combination, a pair of ducts for the exhaust gases of said engines including a pair of tubes extending over the greater part of their length on opposite sides of said fuselage in said substantially horizontal plane, each of said tubes having a rear section with a rearwardly directed outlet, said rear sections being respectively upwardly and downwardly twisted from said horizontal plane and superimposed along the median vertical plane of the aircraft whereby the outlets thereof are vertically aligned in said median plane.

2. In a jet-propelled aircraft having a fuselage and a pair of jet engines symmetrically disposed in a substantially horizontal plane, in combination, a pair of ducts for the exhaust gases of said engines including a pair of tubes extending over the greater part of their length on opposite sides of said fuselage in said substantially horizontal plane, each of said tubes having a rear section with a rearwardly directed outlet and a pair of opposite lateral discharge ports forwardly of said outlet, said rear sections being respectively upwardly and downwardly twisted from said horizontal plane and superimposed along the median vertical plane of the aircraft whereby the outlets and the respective discharge ports thereof are vertically aligned in and on opposite sides of said median plane.

3. In a jet-propelled aircraft having a fuselage terminating in a tail section with elevated empennage and a pair of jet engines positioned symmetrically in a substantially horizontal plane forwardly of said empennage below the level thereof, in combination, a pair of ducts for the exhaust gases of said engines including a pair of tubes extending over the greater part of their length on opposite sides of said fuselage in said substantially horizontal plane below the level of said empennage, each of said tubes having a rear section with a rearwardly directed outlet, said rear sections being respectively upwardly and downwardly twisted from said horizontal plane and superimposed along the median vertical plane of the aircraft whereby the outlets thereof are vertically aligned in said median plane below said empennage.

4. In a jet-propelled aircraft having a fuselage terminating in a tail section with elevated empennage and a pair of jet engines positioned symmetrically in a substantially horizontal plane forwardly of said empennage below the level thereof, in combination, a pair of ducts for the exhaust gases of said engines including a pair of tubes extending over the greater part of their length on opposite sides of said fuselage in said substantially horizontal plane below the level of said empennage, each of said tubes having a rear section with a rearwardly directed outlet and a pair of lateral discharge ports forwardly of said outlet, said rear sections being respectively upwardly and downwardly twisted from said horizontal plane and superimposed along the median vertical plane of the aircraft whereby the outlets and the respective discharge ports thereof are vertically aligned in and on opposite sides of said median plane below said empennage.

References Cited in the file of this patent

UNITED STATES PATENTS

| | | |
|---|---|---|
| 2,557,522 | Vautier | June 19, 1951 |
| 2,638,740 | Sammons | May 19, 1953 |
| 2,857,119 | Morguloff | Oct. 21, 1958 |